United States Patent

Hamilton et al.

[11] Patent Number: 5,200,958
[45] Date of Patent: Apr. 6, 1993

[54] METHOD AND APPARATUS FOR RECORDING AND DIAGNOSING FAULTS IN AN ELECTRONIC REPROGRAPHIC PRINTING SYSTEM

[75] Inventors: Robert S. Hamilton; Daniel C. Chen; Sharon Mathiason; Ronald S. Tomory; Anthony M. Federico, all of Webster, N.Y.

[73] Assignee: Xerox Corporation, Stamford, Conn.

[21] Appl. No.: 589,644

[22] Filed: Sep. 28, 1990

[51] Int. Cl.⁵ .............................................. G06F 11/00
[52] U.S. Cl. .................................. 371/16.4; 371/16.5; 371/29.1; 371/5.1; 371/17
[58] Field of Search .................. 371/16.4, 16.5, 29.1, 371/5.1, 17; 355/203, 204, 205, 206

[56] References Cited

U.S. PATENT DOCUMENTS

| | | | |
|---|---|---|---|
| 3,575,589 | 4/1971 | Neema et al. | 371/17 |
| 3,838,260 | 9/1974 | Nelson | 235/153 AK |
| 3,909,802 | 9/1975 | Cassarino, Jr. et al. | 371/17 |
| 4,133,477 | 1/1979 | Marino et al. | 235/304 |
| 4,339,657 | 7/1982 | Larson et al. | 235/92 QC |
| 4,477,178 | 10/1984 | Furuichi et al. | 355/14 A |
| 4,499,581 | 2/1985 | Miazga et al. | 371/20 |
| 4,514,846 | 4/1985 | Federico et al. | 371/16 |
| 4,633,467 | 12/1986 | Abel et al. | 355/14 SH |
| 4,691,317 | 9/1987 | Miazga et al. | 371/20 |
| 4,739,366 | 4/1988 | Braswell et al. | 371/16 |
| 4,745,602 | 5/1988 | Morrell | 371/29.1 |
| 5,023,817 | 6/1991 | Au et al. | 364/550 |
| 5,036,514 | 7/1991 | Downes et al. | 371/5.1 |
| 5,067,128 | 11/1991 | Nakane | 371/5.1 |
| 5,068,851 | 11/1991 | Bruckert et al. | 371/16.5 |

Primary Examiner—Robert W. Beausoliel, Jr.
Assistant Examiner—Phung M. Chung
Attorney, Agent, or Firm—Oliff & Berridge

[57] ABSTRACT

A method and apparatus provide for recovering from faults in an electronic reprographic system for scanning and synchronously or asynchronously processing and printing a plurality of jobs. The system is monitored for the occurrence of faults in a job, the faults are identified and recorded through a fault logging service and a specific response is initiated to the faults recorded by the fault logging service. Provision is made for using the log offline to determine the cause and effect of problems created by the faults in the system. The invention further provides for using the log online to monitor the occurrence of hardware faults in the system, and initiate the appropriate online diagnostic routine, whose response can further isolate a suspected problem.

12 Claims, 12 Drawing Sheets

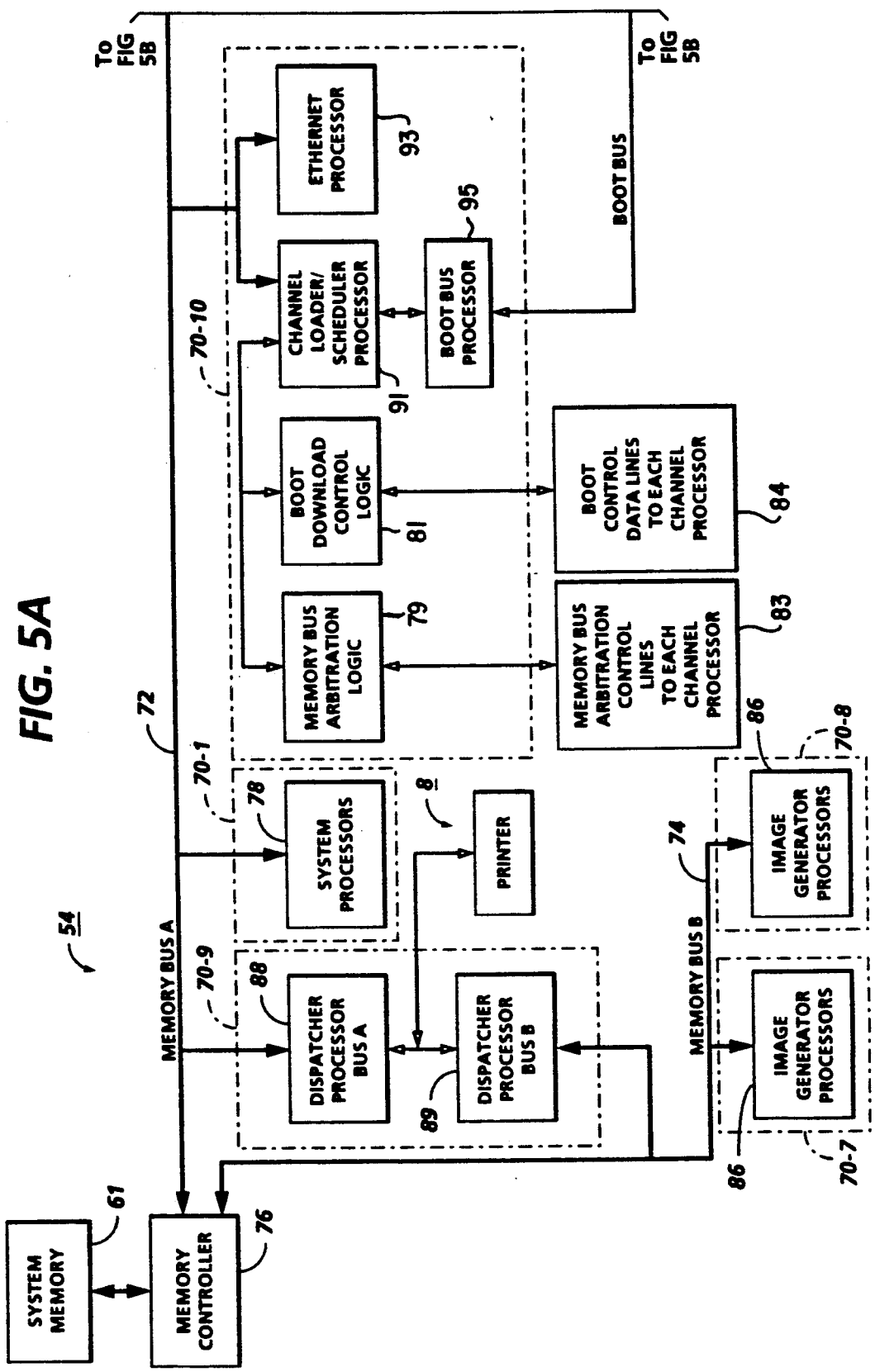

METHOD AND APPARATUS FOR RECORDING AND DIAGNOSING FAULTS IN AN ELECTRONIC REPROGRAPHIC PRINTING SYSTEM

BACKGROUND OF THE INVENTION

1. Field of the Invention

The present invention relates to a system of electronic reprographics and, more particularly, to a method and apparatus for recording and diagnosing faults in an electronic reprographic system.

2. Description of the Related Art

In electronic reprographic printing systems, a complex series of interactions occurs between the software services and objects and the hardware functions to provide the printed or otherwise processed end-product. In such a system, a document or series of documents comprising at least one print job are successively scanned, resulting in image signals which are electronically stored. The signals are later read out successively and transferred to a printer for formation of the images on paper. Such a document can be printed any number of times or processed in any number of ways (e.g., words deleted or added; image magnified or reduced, etc.). If a plurality of documents comprise a job which is being processed, the processing or manipulation of the documents can include deletion of one or more documents, reordering of the documents into a desired order, or addition of a previously or subsequently scanned document or documents. The printing or processing can be relatively synchronous with scanning, or asynchronous after scanning. If asynchronous, a time interval exists between scanning and printing or processing. The system can then accumulate a number of scanned jobs in the system memory for subsequent processing or printing. The order of the jobs to be printed may be different from the order of jobs as scanned depending on the priority of the jobs and the desires of the operator for increasing productivity or through-put and decreasing printer or scanner down-time.

In such a system, faults on all levels of functioning can occur. Software object faults may occur to result in such problems as illegal job parameters, corrupted data, resource problems, input master errors, font problems, etc. Mechanisms for dealing with such faults are an integral and necessary component of the system, because such faults will result in the interruption of the system, and may result in a crash of the system which requires that the system be rebooted Information from the system provided to the operator directing the operator to the fault or faults causing the job interruption is critical to the efficient operation of the system.

The related art has disclosed printing systems with automatic online diagnostic ability for an electronic copier which is activated after a severe fault exceeds a threshold.

U.S. Pat. No. 4,133,477 to Marino et al. discloses a xerographic type copying machine having a fault detection system. Fault flag arrays are associated with each machine component for recording certain faults and machine operation.

U.S. Pat. No. 4,739,366 to Braswell et al. discloses a diagnostic system in a reprographic machine provided with stored optimum operating parameters against which actual operating characteristics may be compared for a determination of repair or adjustment requirements. Event information may be accessed graphically or numerically to show the history of the machine's operation.

U.S. Pat. No. 3,838,260 to Nelson discloses a microprogrammable control memory diagnostic system. Fault information and the status of the system at the time of a fault are stored in memory and enable diagnostics which read out the faulted information.

U.S. Pat. No. 4,499,581 to Miazga et al. discloses a self-testing system for a reproduction machine incorporating self-test routines to test the machine operating logic to insure the integrity and operability of the component parts of the operating logic. A display panel visually identifies any fault to facilitate repair and servicing.

U.S. Pat. No. 4,691,317 to Miazga et al. discloses a method of deselecting features of a xerographic machine to be able to continue operation of the machine even though a fault has been detected, by isolating a detected malfunction to a particular input or output, determining that the particular input or output is related to a specific machine feature, and instructing the operator to deselect that feature for continued machine operation. In the event that the isolated fault is related to a machine feature not selected for the particular job, the fault is ignored.

U.S. Pat. No. 4,477,178 to Furuichi et al. discloses an image forming apparatus having detection devices for detecting trouble in the process unit, and circuitry for preventing image forming operation in response to the detection of a problem by the detection devices.

U.S. Pat. No. 4,633,467 to Abel et al. discloses a computer system fault recovery method which generates error reports in response to detection of error conditions. When a report is received, a list is generated containing probable fault weights for each type of error. A history list of faults is aged and combined with the list to select the most probable fault unit.

While the related art provides for the detection and recording of faults in order to create a history from which an analysis can be made of the faults, the prior art fails to disclose a centralized fault logging service within the system which is used to trigger different specific actions depending on the faults logged, or an online diagnostic which can verify and/or isolate a suspected problem.

OBJECTS AND SUMMARY OF THE INVENTION

Accordingly, one object of the present invention is to provide an electronic reprographic system which records all faults detected in the system through a fault logging service within the system, which service includes time stamping and recording of the fault in a log.

Another object of the present invention is to provide an electronic reprographic system wherein such a log can be used offline to determine the most likely cause and effect of problems.

Another object of the present invention is to provide an electronic reprographic system wherein such a log can be used online to monitor the occurrence of hardware faults A further object of the invention is to provide an electronic reprographic system which provides an online diagnostic which can be used to verify and/or isolate a suspected problem.

A still further object of the invention is to provide an electronic reprographic system wherein the results of such a diagnostic are passed back to the software which invoked the diagnostic, and the fault information is conveyed to the operator.

Another further object of the invention is to provide an electronic reprographic system wherein an offline diagnostic is provided which permits the operator to have access to tests for and the resulting information regarding faults in the system previously available only to the service technician.

To achieve the foregoing and other objects, and to overcome the shortcomings discussed above, an electronic reprographic system for printing a job is provided which monitors the system for the occurrence of faults, initiates a specific response to each fault, and provides for an online diagnostic, the results of which diagnostic are relayed back to the thresholding software initiating such online diagnostic. The fault information so acquired is then conveyed to the operator. Furthermore, the system provides an offline diagnostic which permits the operator to have access to diagnostic tests previously available only to the service technician.

BRIEF DESCRIPTION OF THE DRAWINGS

The invention will be described in detail with reference to the following drawings in which like reference numerals refer to like elements and wherein:

FIGS. 5A, 5B, and 5C comprise a schematic block diagram showing the major parts of the control section for the printing system shown in FIG. 1;

DETAILED DESCRIPTION OF THE PREFERRED EMBODIMENTS

A. System

Figure 1:
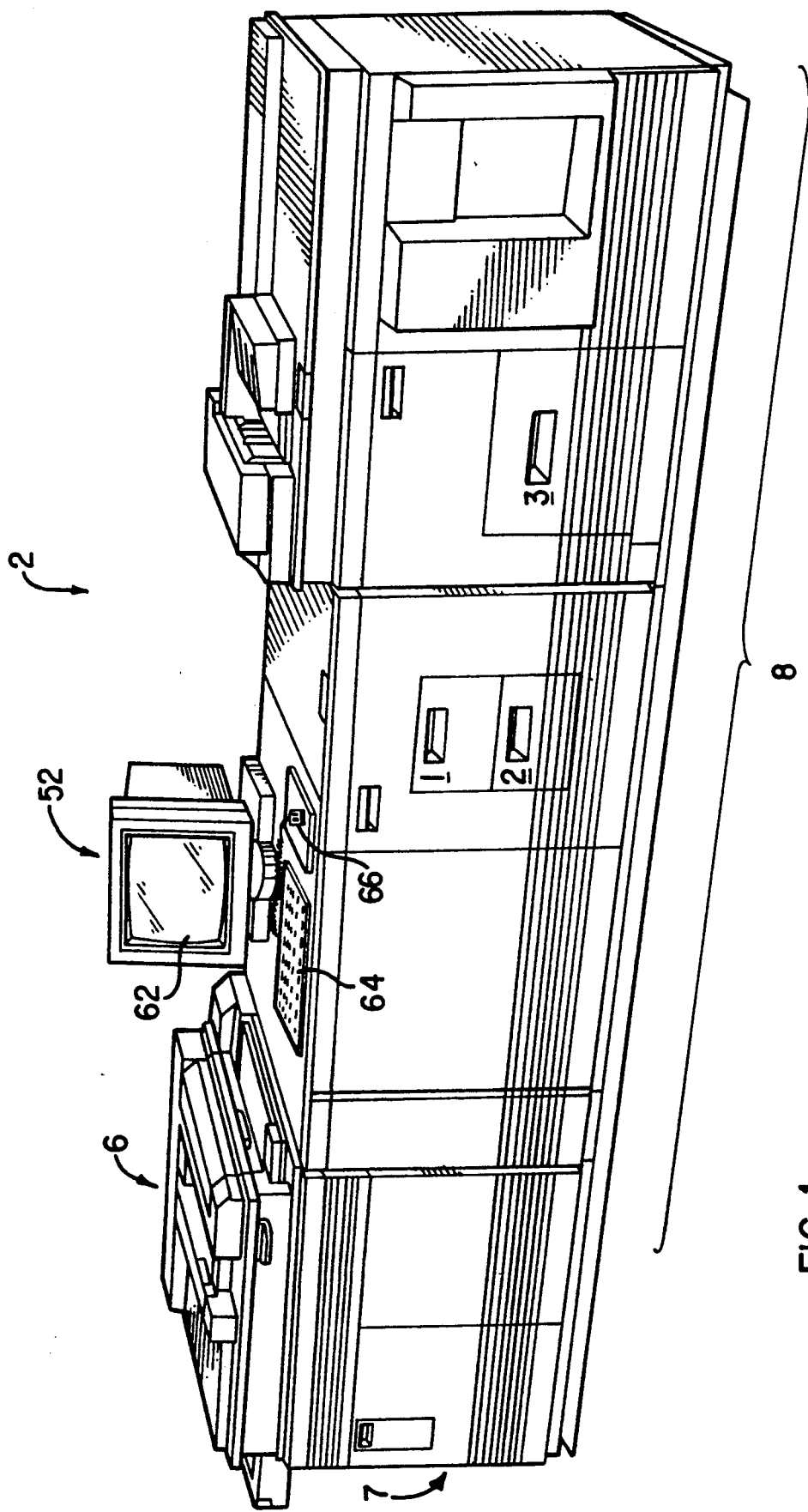
FIG. 1 is a view depicting an electronic printing system incorporating the print media identification system of the present invention.
Figure 2:
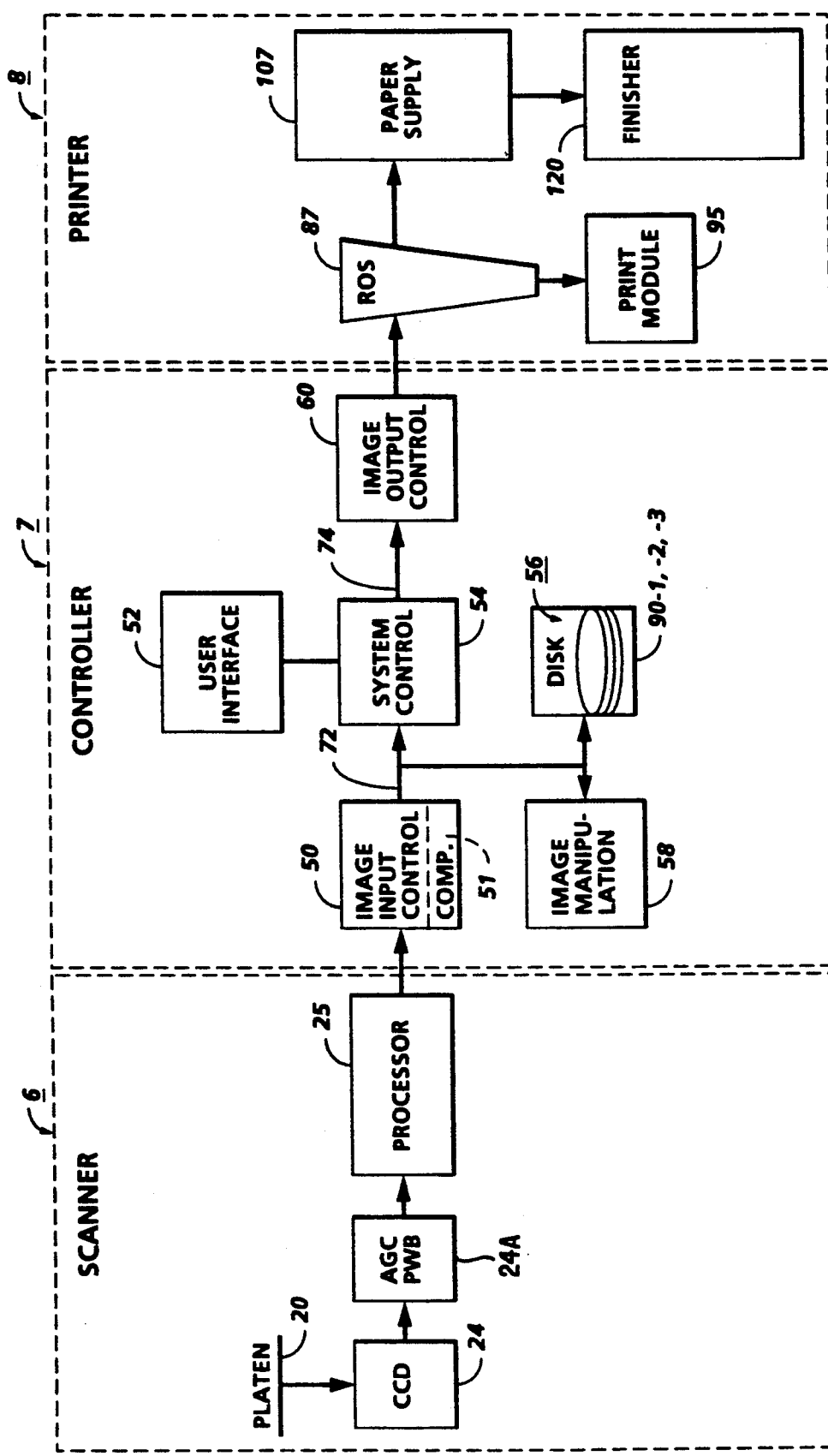
FIG. 2 is a block diagram depicting the major elements of the printing system shown in FIG. 1.

Referring now to the drawings, and particularly to FIGS. 1 and 2 thereof, there is shown an exemplary laser based printing system 2 for processing print jobs in accordance with the teachings of the present invention. Printing system 2, for purposes of explanation, is divided into a scanner section 6, controller section 7, and printer section 8. While a specific printing system is shown and described, the present invention may be used with other types of printing systems such as ink jet, ionographic, etc.

Figure 3:
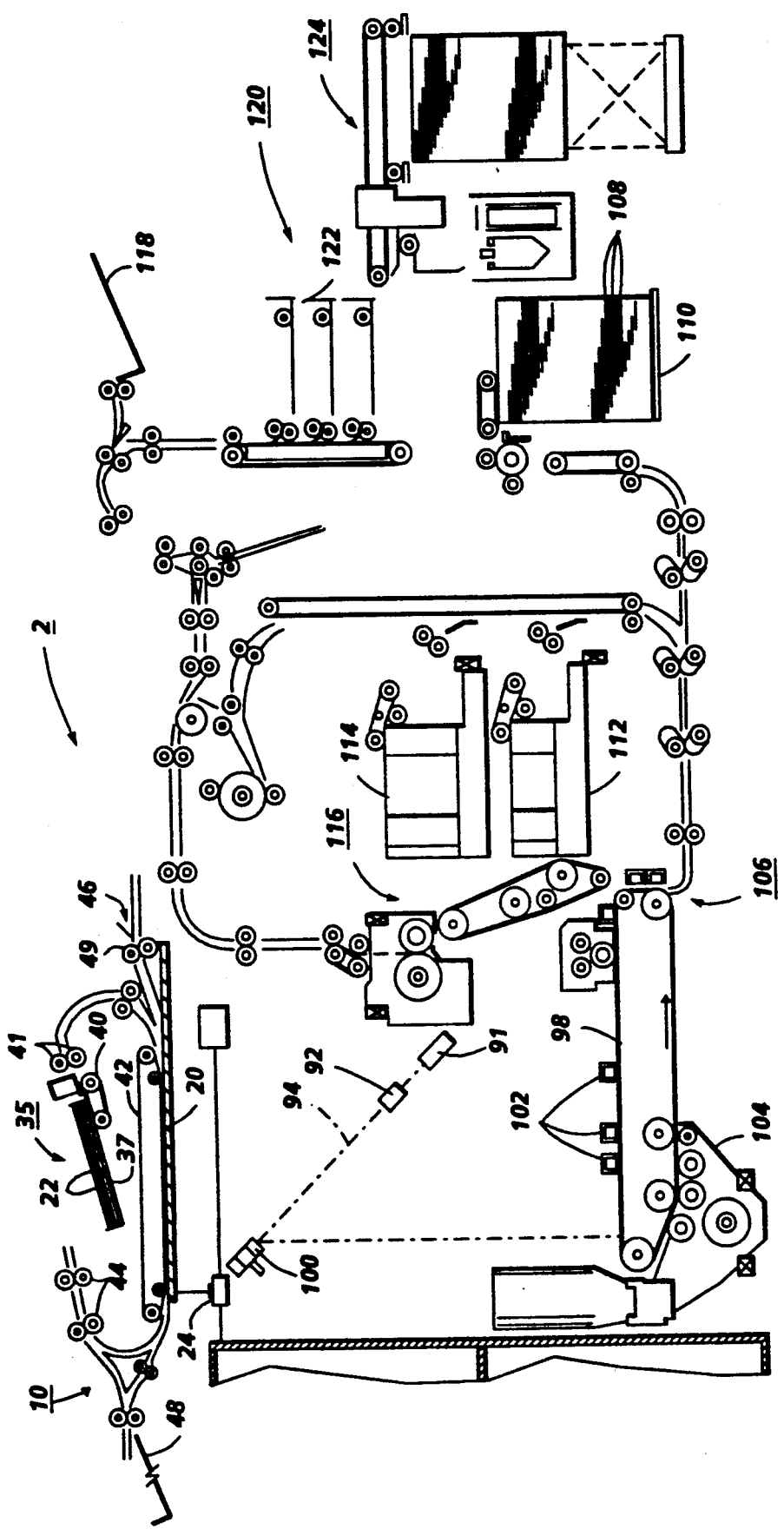
FIG. 3 is a plan view illustrating the principal mechanical components of the printing system shown in FIG. 1.
Figure 4:
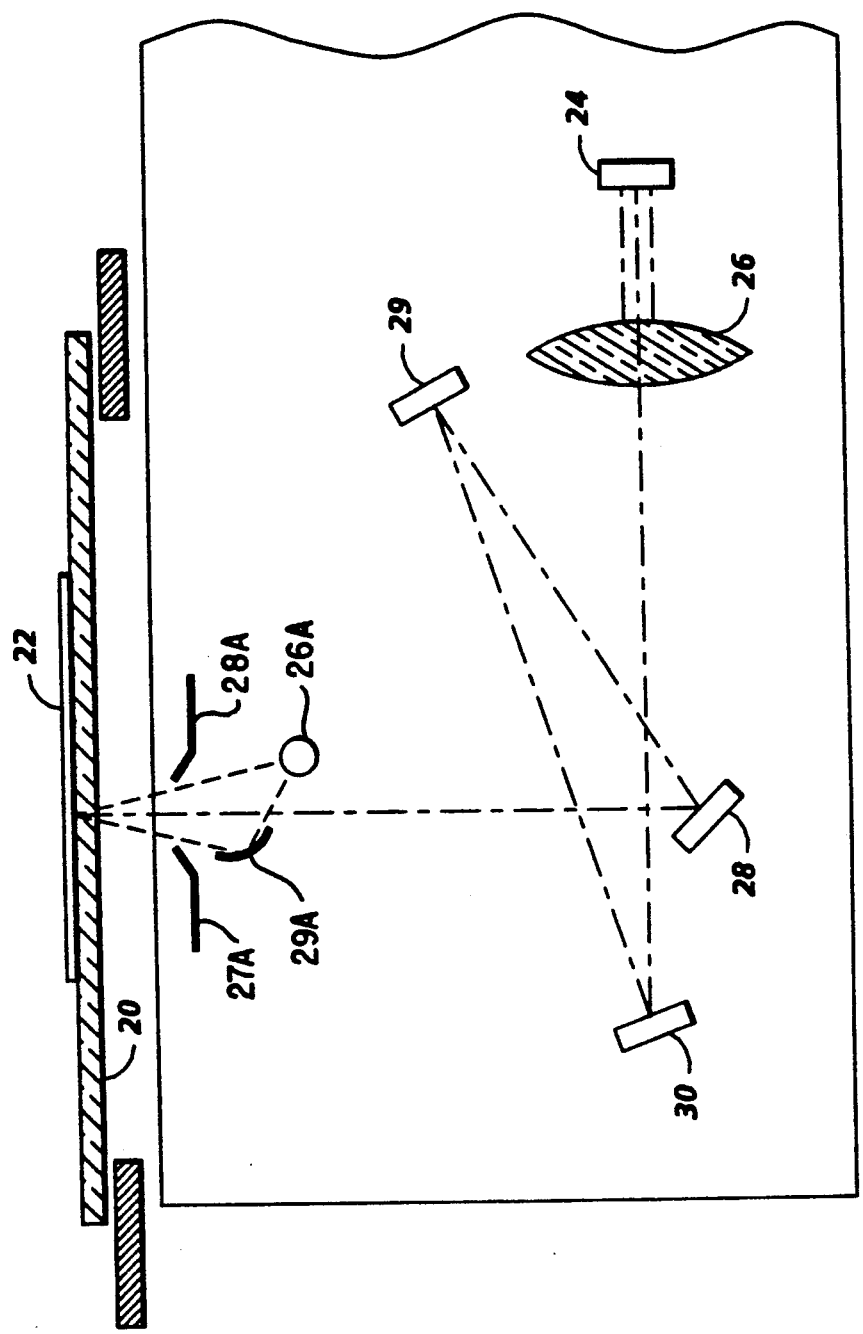
FIG. 4 is a schematic view showing certain construction details of the document scanner for the printing system shown in FIG. 1.

Referring particularly to FIGS. 2–4, scanner section 6 incorporates a transparent platen 20 on which the document 22 to be scanned is located. One or more linear arrays 24 are supported for reciprocating scanning movement below platen 20. Lens 26 and mirrors 28, 29, 30 cooperate with light source 26A, shadow masks 27A and 28A, and reflector 29A to focus array 24 on a line-like segment of platen 20 and the document being scanned thereon. Array 24, through automatic gain control 24A provides image signals or pixels representative of the image scanned which, after suitable processing by processor 25, are output to controller section 7.

Processor 25 converts the analog image signals output by array 24 to digital and processes the image signals as required to enable system 2 to store and handle the image data in the form required to carry out the job programmed. Processor 25 also provides enhancements and changes to the image signals such as filtering, thresholding, screening, cropping, reduction/enlarging, etc. Following any changes and adjustments in the job program, the document must be rescanned.

Documents 22 to be scanned may be located on platen 20 for scanning by automatic document handler (ADF) 35 operable in either a Recirculating Document Handling (RDH) mode or a Semi-Automatic Document Handling (SADH) mode. A manual mode including a Book mode and a Computer Forms Feeder (CFF) mode are also provided, the latter to accommodate documents in the form of computer fanfold. For RDH mode operator, document handler 35 has a document tray 37 in which documents 22 are arranged in stacks or batches. The documents 22 in tray 37 are advanced by vacuum feed belt 40, document feed rolls 41 and document feed belt 42 onto platen 20 where the document is scanned by array 24. Following scanning, the document is removed from platen 20 by belt 42 and returned to tray 37 by document feed rolls 44.

For operation in the SADH mode, a document entry slot 46 provides access to the document feed belt 42 between tray 37 and platen 20 through which individual documents may be inserted manually for transport to platen 20. Feed rolls 49 behind slot 46 form a nip for engaging and feeding the document to feed belt 42 and onto platen 20. Following scanning, the document is removed from platen 20 and discharged into catch tray 48.

For operation in the CFF mode, computer forms material is fed through slot 46 and advanced by feed rolls 49 to document feed belt 42 which in turn advances a page of the fanfold material into position on platen 20.

Referring to FIGS. 2 and 3, printer section 8 comprises a laser type printer and, for purposes of explanation, is separated into a Raster Output Scanner (ROS) section 87, Print Module Section 95, Paper Supply section 107, and Finisher 120. ROS 87 has a laser 90, the beam of which is split into two imaging beams 94. Each beam 94 is modulated in accordance with the content of an image signal input by acousto-optic modulator 92 to provide dual imaging beams 94. Beams 94 are scanned across a moving photoreceptor 98 of Print Module 95 by the mirrored facets of a rotating polygon 100 to expose two image lines on photoreceptor 98 with each scan and create the latent electrostatic images represented by the image signal input to modulator 92. Photoreceptor 98 is uniformly charged by corotrons 102 at a charging station preparatory to exposure by imaging beams 94. The latent elctrostatic images are developed by developer 104 and transferred at transfer station 106 to a print media 108 delivered by Paper Supply section 107. Media 108 as will appear may comprise any of a variety of sheet sizes, types, and colors. For transfer, the print media is brought forward in timed registration with the developed image on photoreceptor 98 from either a main Paper tray 10 or from auxiliary Paper trays 112, or 114. The developed image transferred to the print media 108 is permanently fixed or fused by fuser 116 and the resulting prints discharged to either output tray 118, or to finisher 120. Finisher 120 includes a stitcher 122 for stitching or stapling the prints together to form books and a thermal binder 124 for adhesively binding the prints into books.

Referring to FIGS. 1, 2 and 5, controller section 7 is, for explanation purposes, divided into an image input controller 50, User Interface (UI) 52, system controller 54, main memory 56, image manipulation section 58, and image output controller 60.

Figure 5B:
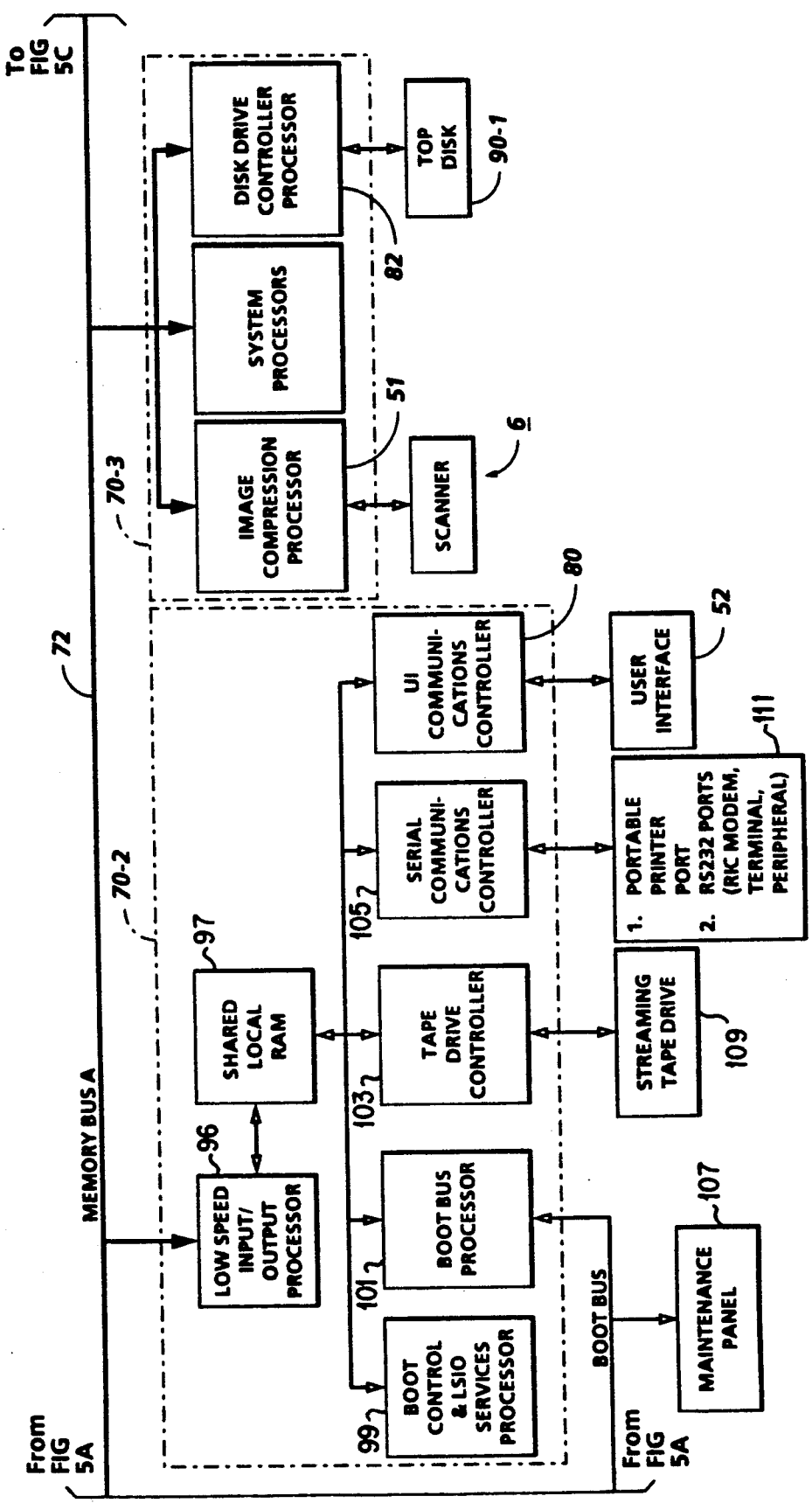
Figure 5C:
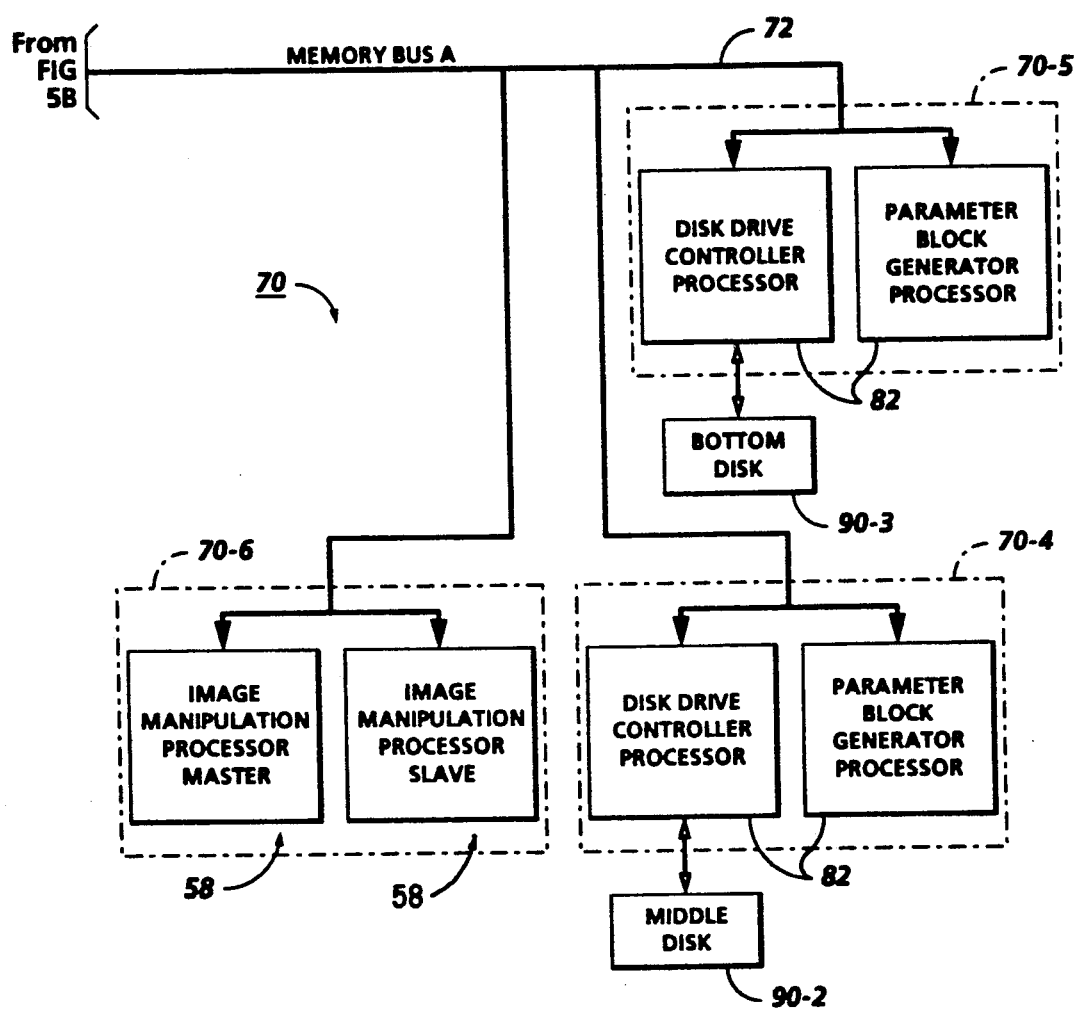

Referring particularly to FIGS. 5A–5C, control section 7 includes a plurality of Printed Wiring Boards (PWB's) 70, PWB's 70 being coupled with one another and with System Memory 61 by a pair of memory buses 72,74. Memory controller 76 couples System Memory 61 with buses 72, 74. PWB's 70 include system processor PWB 70-1 having plural system processors 78; low speed I/O processor PWB 70-2 having UI communication controller 80 for transmitting data to and from UI 52; PWB's 70-3, 70-4 and 70-5 having disk drive controller/processors 82 for transmitting data to and from disks 90-1, 90-2 and 90-3, respectively, of main memory 56 (image compressor/processor 51 for compressing the image data is on PWB 70-3); image manipulation PWB 70-6 with image manipulation processors of image manipulation section 58; image generation processor PWB's 70-7 and 70-8 with image generation processor 86 for processing the image data for printing by printer section 8; dispatch processor PWB 70-9 having dispatch processors 88 and 89 for controlling transmission of data to and from printer section 8; and boot control-arbitration-scheduler PWB 70-10 which includes memory bus 79, boot down load control 81, memory bus 83, boot control 84, loader/processor 91, ethernet processor 93 and boot bus processor 95.

The scanned image data input from processor 25 of scanner section 6 to controller section 7 is compressed by image compressor/processor 51 of image input controller 50 on PWB 70-3. As the image data passes through compressor/processor 51, it is segmented into slices N scanlines wide, each slice having a slice pointer. The compressed image data together with slice pointers and any related image descriptors providing image specific information (such as height and width of the document in pixels, the compression method used, pointers to the compressed image data, and pointers to the image slice pointers) are placed in an image file The image files, which represent different print jobs, are temporarily stored in system memory 61 which comprises a Random Access Memory or RAM pending transfer to main memory 56 where the data is held pending use.

As best seen in FIG. 1, UI 52 includes a combined operator controller/CRT display consisting of an interactive touchscreen 62, keyboard 64, and mouse 66. UI 52 interfaces the operator with printing system 2, enabling the operator to program print jobs and other instructions, to obtain system operating information, instructions, programming information, diagnostic information, etc. Items displayed on touchscreen 62 such as files and icons are actuated by either touching the displayed item on screen 62 with a finger or by using mouse 66 to point cursor 67 to the item selected and keying the mouse.

Main memory 56 has plural hard disks 90-1, 90-2, 90-3 for storing machine Operating System software, machine operating data, and the scanned image data currently being processed.

When the compressed image data in main memory 56 requires further processing, or is required for display on touchscreen 62 of UI 52, or is required by printer section 8, the data is accessed in main memory 56. Where further processing other than that provided by processor 25 is required, the data is transferred to image manipulation section 58 on PWB 70-6 where the additional processing steps such as collation, make ready, decomposition, etc., are carried out. Following processing, the data may be returned to main memory 56, sent to UI 52 for display on touchscreen 62, or sent to image output controller 60.

Image data output to image output controller 60 is decompressed and readied for printing by image generating processors 86 of PWB's 70-7, 70-8 (seen in FIG. 5A). Following this, the data is output by dispatch processors 88, 89 on PWB 70-9 to printer section 8. Image data sent to printer section 8 for printing is normally purged from memory 56 to make room for new image data.

Figure 6:
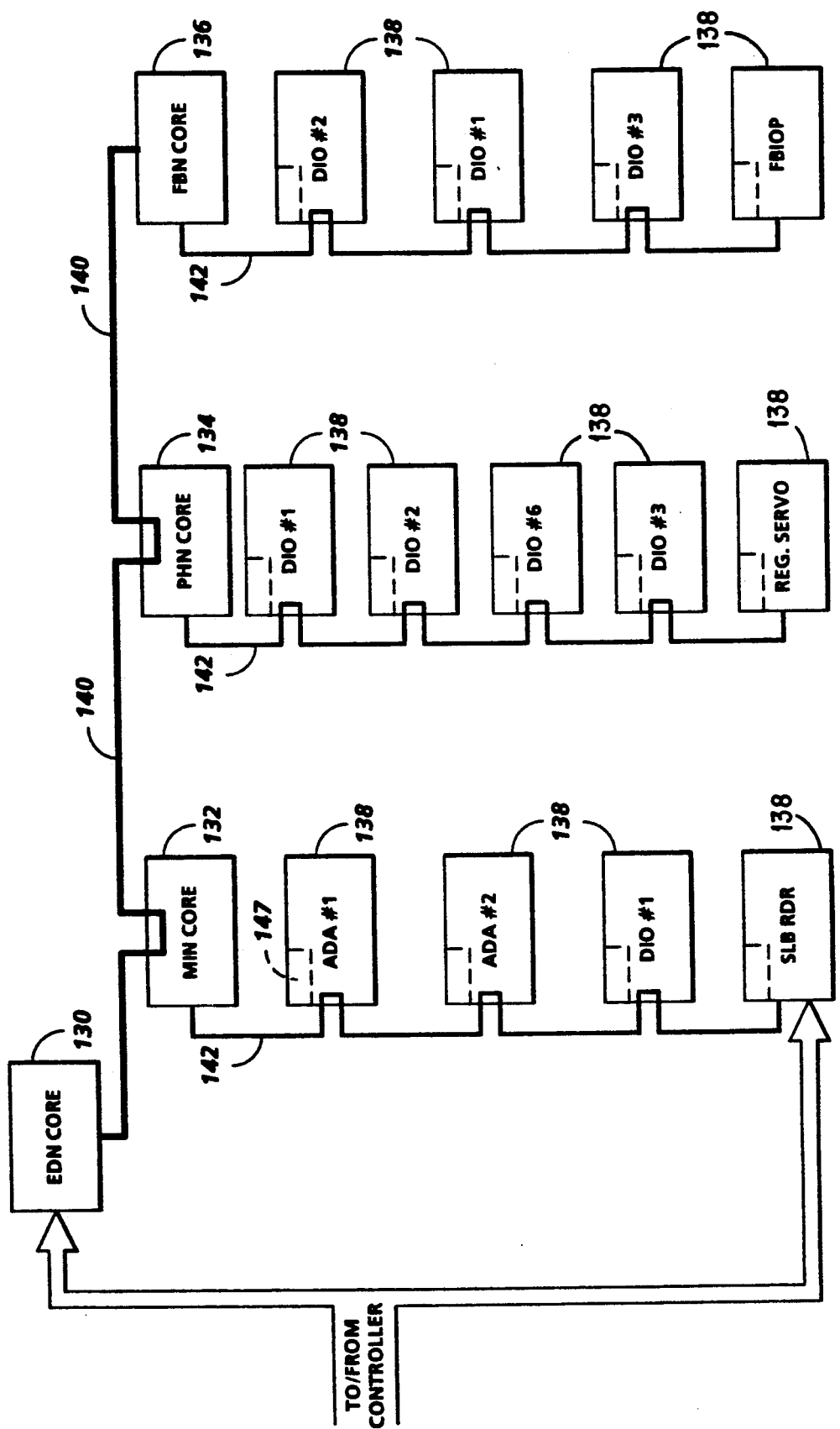
FIG. 6 is a block diagram of an Operating System, together with Printed Wiring Boards and shared line connections for the printing system shown in FIG. 1.

Referring particularly to FIG. 6, system control signals are distributed via a plurality of printed wiring boards (PWB's). These include EDN core PWB 130, Marking Imaging core PWB 132, Paper Handling core PWB 134, and Finisher Binder core PWB 136 together with various Input/Output (I/O) PWB's 138. A system bus 140 couples the core PWB's 130, 132, 134 and 136 with each other and with controller section 7 while local buses 142 serve to couple the I/O PWB's 138 with each other and with their associated core PWB.

On machine power up, the Operating System software is loaded from memory 56 to EDN core PWB 130 and from there to the remaining core PWB's 132, 134 and 136 via bus 140, each core PWB 130, 132, 134, 136 having a boot ROM (not shown) for controlling downloading of Operating System software to the PWB, fault detection, etc. Boot ROMs also enable transmission of Operating System software and control data to and from PWB's 130, 132, 134 and 136 via bus 140 and control data to and from I/O PWB's 138 via local buses 142. Additional ROM, RAM, and NVM memory types are resident at various locations within system 2.

Figure 7:
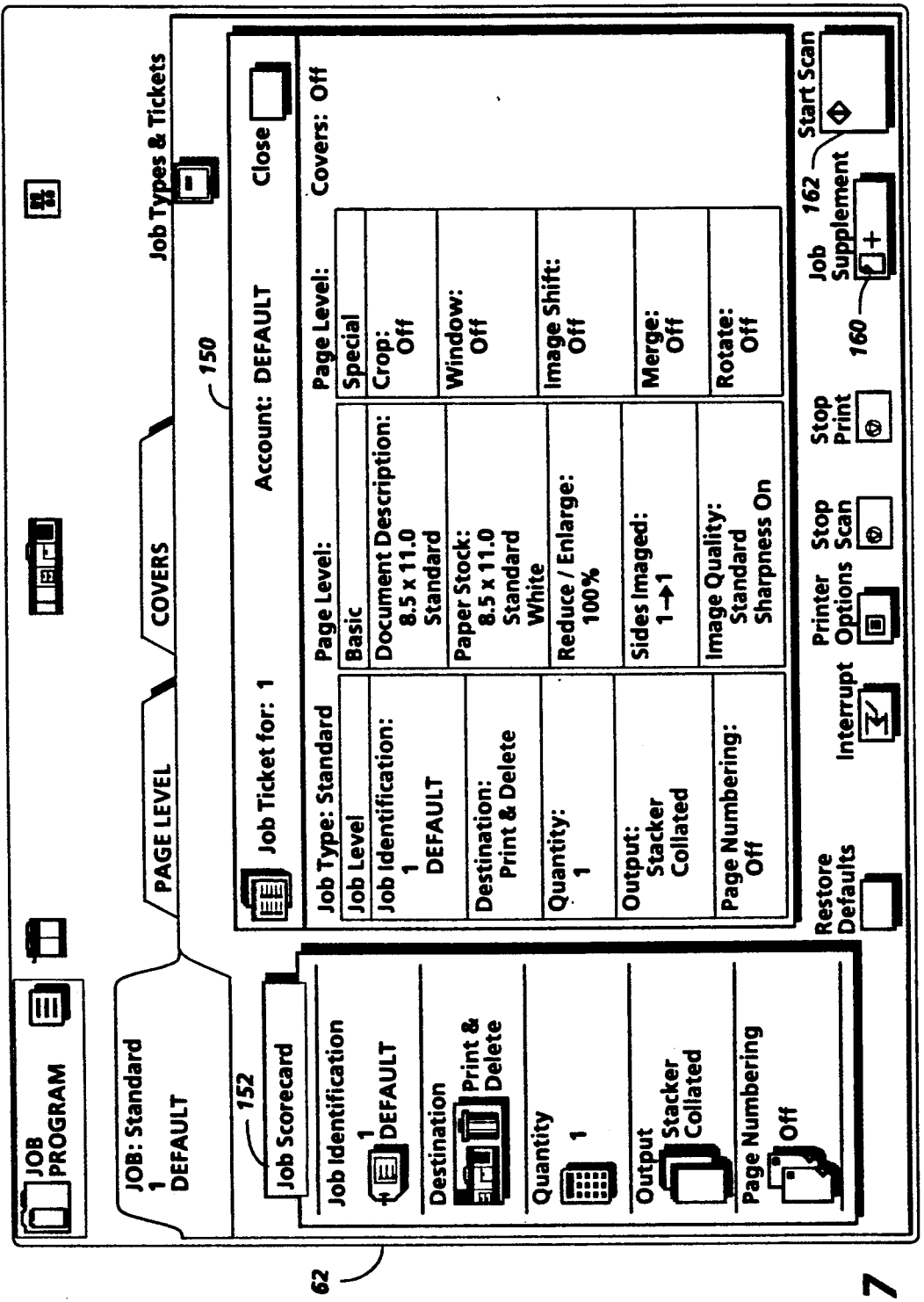
FIG. 7 is a view depicting an exemplary job programming ticket and job scorecard displayed on the User Interface (UI) touchscreen of the printing system shown in FIG. 1.

Referring to FIG. 7, jobs are programmed in a Job Program mode in which there is displayed on touchscreen 62 a Job Ticket 150 and a Job Scorecard 152 for the job being programmed. Job Ticket 150 displays various job selections programmed while Job Scorecard 152 displays the basic instructions to the system for printing the job Fault Operation A fault or crash is an unpredictable condition in any part of the system 2 which causes a subset of the system elements to become unavailable to the operator. Some examples are:

At the system level: Where a reboot (restart of the system after a crash which could be initiated by the system or through an operator intervention at UI 52) or a repowering (initiated by an operator only, but could include a loss of power) occurs.

At the system element level: Where the system attempts to recover automatically by reinitializing or resoftloading the system element. Additionally, during certain fault recovery procedures, the operator may cause the system to reinitialize or resoftload the system elements to achieve recovery.

At the hardware level: Where the system hardware becomes inoperative.

In the event of a fault or a crash, the system provides built-in diagnostic routines for the identification of a fault or a crash, whereby the scanner section 6 and printer section 8 and their corresponding subsections are in communication with the controller section 7 continually providing information to the controller regarding their statuses. Such internal communication within the system is transparent to the operator during normal operating conditions of the system (i.e., non-fault and non-crash conditions). The system also provides for the status information to be selectively accessible when the system determines that interaction with the operator and/or the technician is required. The system also provides for notification to the operator of faults within the system. In the event of a crash, the system provides the information needed by the operator and/or the technician of the cause and methods of recovery. The present invention provides for a greater amount of information being made available to the operator through the system, in order to decrease both the dependency of the system and the operator on technical assistance requiring service calls and the concomitant downtime of the system.

Accordingly, the system includes a crash recovery operation which will return the system elements to a functional state after a crash has occurred. During recovery, the initial cause of the crash (i.e., the fault) must be cleared. Whenever possible, the first attempt at recovery will be automatic, with no operator intervention, and without impact to the other system elements. If assistance is required, it will be at the operator level. If a hardware failure is detected during the system self-test, a fault code will be displayed at UI 52 to alert the operator that a service call is in order.

Categories of crashes which occur in system 2 include:

1) those that the operator cannot perceive, but are automatically recoverable;

2) those which cause the system to automatically recover to a certain level, but which also require the operator to assist in order to finish recovery; and 3) those in which the system cannot automatically recover, and which require the operator to initiate the process of recovery (e.g., booting, cycling power).

In an electronic reprographic system of the size and complexity as described herein, a large number and diverse range of both software and hardware faults are possible. Individually, each fault is important to a specific component of the system 2, but the fault may also be the cause of a larger problem as well. It is important to be able to centralize and reduce the amount of code needed to process each fault through the controller section 7. This is accomplished in the present invention by recording all faults that occur in system 2 through a fault logging service, which includes the steps of time stamping the fault, and recording the fault in a log. The log is used offline to debug the system and determine the most likely cause and effect of the problem.

The controller section 7 also implements a threshold algorithm which monitors the occurrence of hardware faults and determines which specific actions will be triggered by the specific faults and/or combinations of faults that are logged within the fault logging service. If excessive faults greater than the threshold occur on a specific device, an online diagnostic may be triggered to verify that a problem exists and/or isolate a suspected problem from other problems discovered within the system. The programs within the controller 7 provide for an internal interactive capability between the operator and the diagnostic services available within the controller 7. Such internal interaction is accomplished by means of a "software client" which acts as an intermediary between the operator and the internal diagnostic services. The online and offline diagnostic services consist of a specific, established sequence of steps for identifying and evaluating each specific type of faults which can occur within the image input, image output, and image manipulation services of the system 2. The software client provides the interactive link necessary for the diagnostic services to receive commands or other communications from the operator, and to relay to the operator the results of the diagnostic tests or any other information necessary to the operator. The software client program provides for a more flexible, interactive capability between the operator and the components of the system 2.

Thus, the present invention provides for the online diagnostic to proceed automatically in an attempt to avoid the need for service calls. When a severe fault or a fault whose threshold is exceeded occurs, instead of raising that fault to the operator, whose only option to recover is to reboot the entire system 2, the following 1) Operator attempts to clear fault by cancelling or saving the job, which frees up hardware and resources necessary to run the diagnostic routine;

2) The resources for running the online diagnostic is scheduled through the scheduler within the controller section 7;

3) The operator is informed by an appropriate icon at the UI 52 that an online diagnostic is running, i.e., the system 2 incorporates diagnostic routines available to Technical Service Operators (or technicians) who inspect the machine when the operator calls for service The diagnostic routines are normally only accessible by the technician who interacts with the routine when servicing the machine. According to the invention, the normally inaccessible diagnostic routines are activated, but all interactive operations used by the technician are suppressed. This is achieved by having a separate software client for each mode (offline versus online diagnostic) which detaches and interacts with a monolithic test executive in a parallel manner;

4) The online diagnostic is run, while all interactive operations are suppressed; and 5) The results of the online diagnostic are passed back to the thresholding software in controller section 7 which originally invoked the online diagnostic. If a fault was detected by the diagnostic, it is raised to the operator. Otherwise, the original fault is raised.

The online diagnostic capabilities described can be used for services provided at the image input control 50 level, the image manipulation 58 level, and at the image output control 60 level. The diagnostic capabilities provided herein permit fault detection at the system 2 level which previously was only capable after a service call had been made by a technical representative. The present invention places a broad range of diagnostic capabilities within the possession of the operator, which provides for faster recovery from faults and return to service for the system 2.

Furthermore, the diagnostic capabilities of the present invention permit isolation among the plurality of PWB's 70 when the diagnostic is performed at the image output controller 60 level. The isolation provided by the diagnostic faults is often much better than the original threshold/severe fault determination.

Figure 8A:
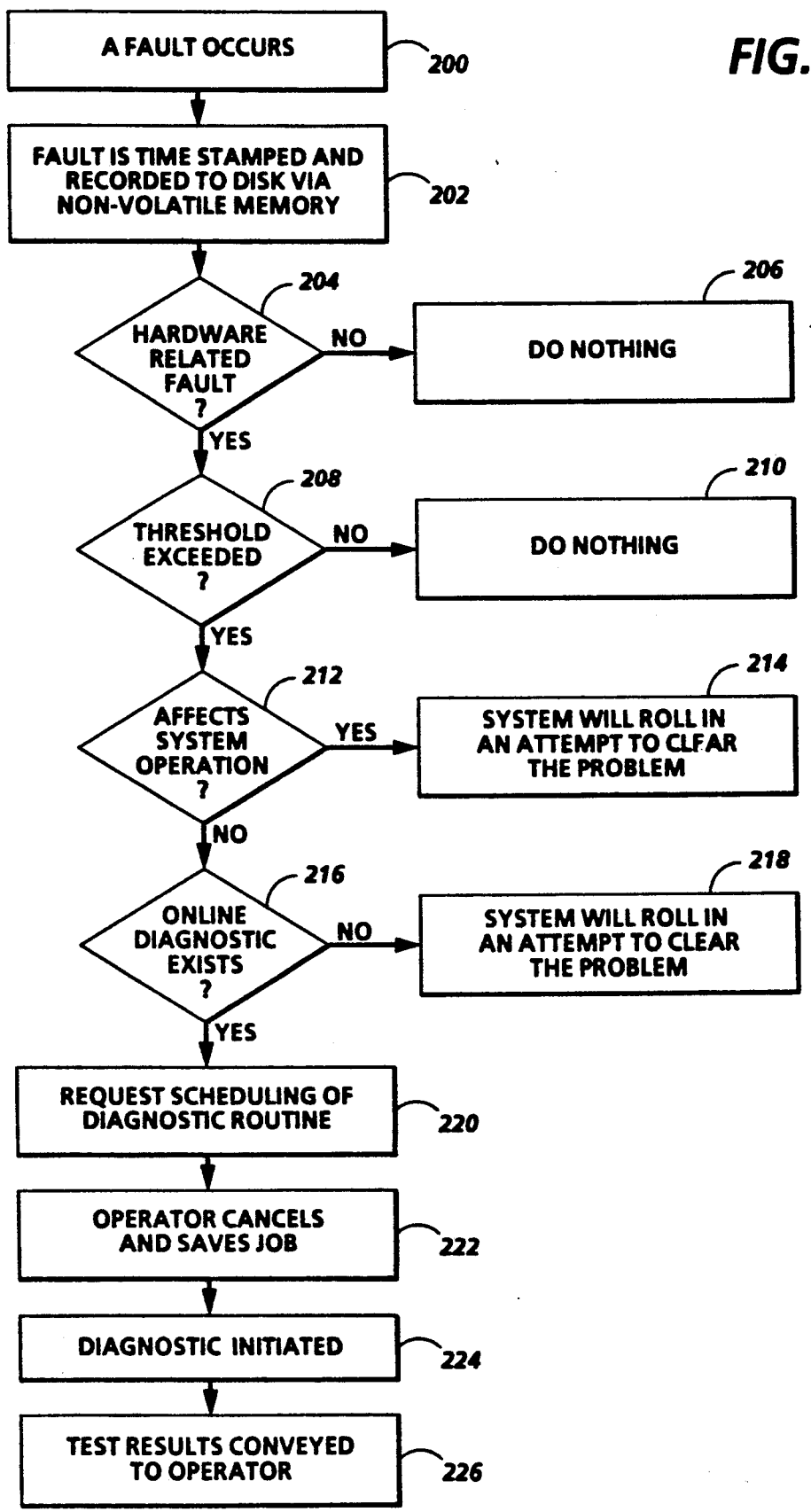
FIG. 8A depicts the operation of the system 2 with respect to the processing of faults in the system 2 by the controller 7.

FIG. 8A depicts the operation of the system 2 with respect to the recording of faults in the system by the controller 7.

The controller 7 continually monitors the jobs within the system 2 (Step 200), processing all data regarding the statuses within the system 2, the features of each job in the system 2, and the presence of faults in the system 2. All faults that occur in the system 2 are logged to a central fault logging service, including those faults detected by online or offline diagnostics. This service time stamps the faults and stores them within controller 7 (Step 202) by means of Non-Volatile Memory (NVM, not shown). Any fault that is raised to the operator via the user interface 52 is also logged, so that examining the fault log offline provides a comprehensive view of all faults that have occurred and what the resultant effects to the system 2 are.

If the fault is not related to hardware (Step 204), nothing else is done (Step 206). If the fault is related to hardware, but the occurrence of this fault is not considered fatal, i.e., does not exceed a previously established threshold number, (Step 208), nothing else is done (Step 210). Some faults are not fatal unless they occur several 'times within a specified period of time (the threshold number). If the same fault's occurrence exceeds this threshold number, it is treated as fatal.

If the fault that was logged is related to hardware and its specific threshold has been exceeded, a check is made to determine what part of the system the fault is associated with. If the fault affects the overall system (Step 212), the fault is raised immediately to the controller 7, which will reboot the system 2 in an attempt to reset the device (Step 214).

If the fault does not affect the whole system 2, a check is made to determine if an online diagnostic is available (Step 216). If a diagnostic is not available, the fault is raised to the operator notifying the operator that a specific device is unavailable (Step 218). Examples of such devices that, though unavailable, will not prevent the functioning of other components of the system 2, are streaming tape, which permits the system to load extra fonts, or the PWB which provides the ability to review the contents of the pages being printed. Similarly, the scanner's inability to scan or the printer's inability to print will not necessarily interfere with the other component's ability to function.

If the faulted device has an online diagnostic available, a request will be made to schedule the diagnostic routine (Step 220). The operator is provided the opportunity to cancel and save the incomplete job (Step 222), and the online diagnostic is initiated (Step 224), while all other interactive functions which have access to the affected hardware within the system 2 are suppressed. On completion of the online diagnostic, the results are conveyed to the operator via the UI 52 (Step 226).

Figure 8B:
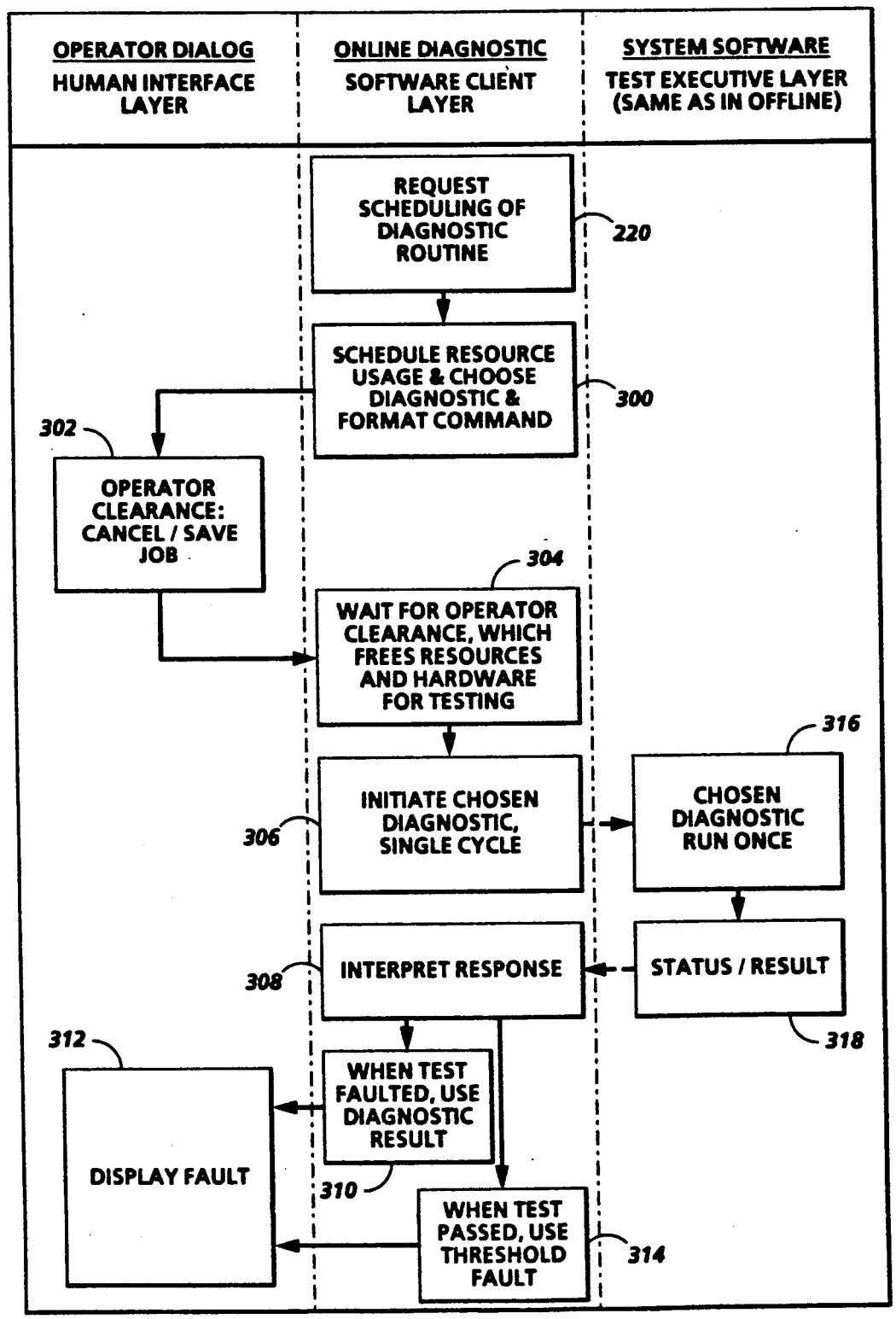
FIG. 8B provides a flowchart of the instructions between the operator, the software client, and the on-line diagnostic service.

FIG. 8B provides a flowchart of the sequence of events which occurs when an online diagnostic for the faulted device is available. As shown at the head of FIG. 8B, the online diagnostic operation is a collaborative and parallel effort between the operator via the human interface level, the software client, and the diagnostic. As described earlier in FIG. 8A, if the faulted device has an online diagnostic available, a request is made to schedule the diagnostic routine step (Step 220). This scheduling of the online diagnostic test which is available within the system 2 (and applicable to the faulted device) forces the freeing of resources within the system needed to run the test (Step 300). In addition, the operator is also provided the opportunity to either cancel or to save the job presently being processed within the system 2 (Step 302). This is done to avoid having conflicting usage of the faulted device. The software client waits for the operator clearance command and then formats the command for the diagnostic test chosen (Step 304). Once these commands are provided to/provided by the software client, the software client provides the diagnostic service with the direction to run the chosen test (Step 306). At this time, the test is run once by the diagnostic service, while all other functions within the system 2 remain active (Step 316). The test results which are derived from the test being run on the system 2 are conveyed to the software client (Step 318), which then interprets the response to the command for the test to be run (Step 308). In the event that the test is faulted, i.e., the test was not passed (Step 310), the software client provides the operator via the user interface 52 with a notification of the fault which has been discovered (Step 312). In the event that the test is passed (Step 314), then the software client provides the operator via the user interface 52 with the notification of the fault which originally caused the threshold to be exceeded. The software specification for FIG. 8B is provided in the Appendix.

Figure 8C:
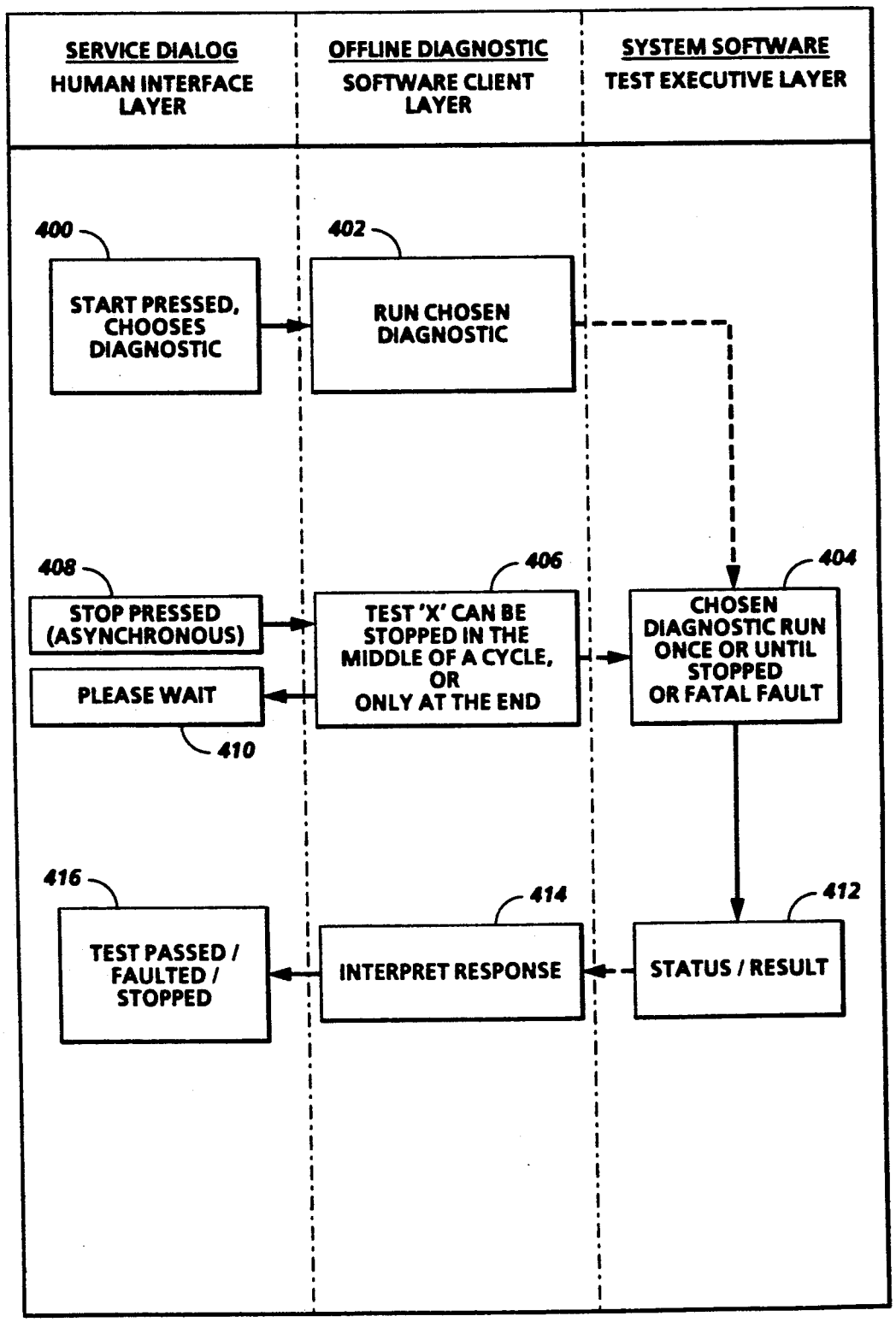
FIG. 8C provides a flowchart of the interaction between the operator, the software client and the offline diagnostic service.

FIG. 8C provides a flowchart of the sequence of events which occur when an offline diagnostic has been requested that is usually only accessible by the service technician. This figure and description are provided to illustrate how the diagnostic test interacts with a different software client, yet preserves the integrity of the diagnostic test execution.

The net effect of the online diagnostic execution is to run a diagnostic test, normally only available to the service technician, before the service technician arrives at the site. The operator can then inform the service technician of the online diagnostic fault when making the initial call for service. The result of the online diagnostic test will usually provide better hardware fault isolation, so the service technician can arrive at the site with the replacement for the failed PWBA (printed wire board assembly), thereby minimizing system 2 downtime. At the command of the service technician via the user interface 52 (Step 400), the software client is provided with the direction to run the specified offline diagnostic test (Step 402). (This request can be to run the test only once or continuously until stopped by the service technician.) The software client transmits this command to the offline diagnostic service which proceeds to run the test requested, while all other functions within the system 2 remain inactive (Step 404). It is an option provided by the software client that this test can be stopped at anytime (Step 406) when requested by the service technician (Step 408). Otherwise, the test will proceed until it is finished, or until a fatal fault is discovered (Step 412). The diagnostic service provides the results of the test to the software client which interprets the response (Step 414) and conveys the results to the service technician via the user interface 52 (Step 416). The software specification for FIG. 8C is provided in the Appendix.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A method for recording and diagnosing faults in an electronic reprographic system for scanning and processing and printing a plurality of jobs, comprising the steps of:
   monitoring the system for occurrence of faults in a job;
   providing a fault logging service;
   recording each fault of said faults in the fault logging service;
   determining whether the number of recordings of a particular fault in said fault logging service exceeds a previously determined threshold number set for said particular fault;
   providing an online diagnostic routine for at least one of the faults recordable in the fault logging service;
   determining whether an online diagnostic routine is available for the particular fault when a determination is made that occurrences of said particular fault have exceeded said threshold number set for said particular fault; and
   providing information to an operator regarding said particular fault recorded in said fault logging service means and providing information to the operator regarding an available online diagnostic routine related to said particular fault.

2. The method as recited in claim 1, wherein the step of recording each fault through a fault logging service includes time stamping and recording each fault in said fault logging service.

3. The method as recited in claim 2, further comprising the step of using the fault logging service offline to determine cause and effect of problems created by at least one fault in the system.

4. The method as recited in claim 2, further comprising the step of using the fault logging service online to monitor occurrence of hardware faults in the system.

5. The method as recited in claim 1, further comprising the step of initiating a selectively accessible online diagnostic routine while suppressing interactive subroutines in said online diagnostic routine to evaluate a fault.

6. The method as recited in claim 5, further comprising the step of informing the operator of the results of the online diagnostic routine.

7. An apparatus for recording and diagnosing faults in an electronic reprographic system for scanning and processing and printing a plurality of jobs, comprising:
   means for monitoring the system for occurrence of faults in a job;
   a fault logging means;
   means for recording each fault of said faults in said fault logging means;
   means for determining whether the number of recordings of a particular fault in the fault logging means exceeds a previously determined threshold number set for the particular fault;
   providing means for providing at least one online diagnostic routine;
   means for determining whether an online diagnostic routine is available from the providing means for the particular fault when a determination is made that the number of recordings of said particular fault in the fault logging means has exceeded said threshold number set for said particular fault; and
   means for providing information to an operator regarding said particular fault recorded in said fault logging means and means for providing information from the providing means regarding an available online diagnostic routine related to said particular fault.

8. The apparatus as recited in claim 7, wherein the means for recording each of said plurality of faults through a fault logging means includes means for time stamping and means for recording each said fault in a log.

9. The apparatus as recited in claim 8, further comprising means for using the fault logging means offline to determine the cause and effect of problems created by at least one fault in the system.

10. The apparatus as recited in claim 8, further comprising means for using the fault logging recording means online to monitor occurrence of hardware faults in the system.

11. The apparatus as recited in claim 7, further comprising means for initiating a selectively accessible online diagnostic routine and means for suppressing interactive subroutines in said online diagnostic routine to evaluate a fault.

12. The apparatus as recited in claim 11, further comprising means for informing the operator of results of the online diagnostic routine.

* * * * *